United States Patent
Gong et al.

(10) Patent No.: US 11,265,639 B2
(45) Date of Patent: Mar. 1, 2022

(54) METHOD FOR EARBUD SWITCHING, WEARABLE DEVICE, AND STORAGE MEDIUM

(71) Applicant: GUANGDONG OPPO MOBILE TELECOMMUNICATIONS CORP., LTD., Guangdong (CN)

(72) Inventors: Jinhua Gong, Guangdong (CN); Baoti Li, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 17/163,042

(22) Filed: Jan. 29, 2021

(65) Prior Publication Data
US 2021/0152914 A1  May 20, 2021

Related U.S. Application Data

(63) Continuation of application No. PCT/CN2019/098951, filed on Aug. 1, 2019.

(30) Foreign Application Priority Data

Aug. 1, 2018  (CN) .......................... 201810866720.4

(51) Int. Cl.
*H04R 25/00* (2006.01)
*H04R 1/10* (2006.01)
(52) U.S. Cl.
CPC ......... *H04R 1/1016* (2013.01); *H04R 1/1041* (2013.01); *H04R 2420/07* (2013.01)
(58) Field of Classification Search
CPC .......................... H04R 1/1016; H04R 1/1041
See application file for complete search history.

(56) References Cited

U.S. PATENT DOCUMENTS

2012/0218158 A1  8/2012  Park
2013/0316642 A1*  11/2013  Newham ............. H04R 1/1091
                                                        455/11.1

(Continued)

FOREIGN PATENT DOCUMENTS

CN  106851452 A  6/2017
CN  106937197 A  7/2017

(Continued)

OTHER PUBLICATIONS

International Search Report with English Translation of International application No. PCT/CN2019/098951, dated Oct. 30, 2019 (12 pages).

(Continued)

*Primary Examiner* — Simon King
(74) *Attorney, Agent, or Firm* — Young Basile Hanlon & MacFarlane, P.C.

(57) ABSTRACT

A volume-based earbud switching method is applied to a wearable device. The wearable device includes: a first earbud and a second earbud; The method includes: obtaining a first volume of the first earbud and a second volume of a second earbud; calculating a first power consumption speed of the first earbud and a second power consumption speed of the second earbud; and determining an earbud switching policy between the first earbud and the second earbud according to the first and the second power consumption speeds; and sending an earbud switching command to an electronic device connected with the wearable device according to the earbud switching policy, wherein the earbud switching command is used to direct the electronic device to execute switching between the first earbud and the second earbud.

20 Claims, 4 Drawing Sheets

Electronic device

Wireless earphones

(56) References Cited

U.S. PATENT DOCUMENTS

2014/0141724 A1* 5/2014 Liu .................. H04B 1/12
                                                455/63.1
2017/0195769 A1   7/2017 Chang et al.
2020/0008124 A1*  1/2020 Gong ............... H04W 52/0264

FOREIGN PATENT DOCUMENTS

| CN | 107071618 A | 8/2017 |
| CN | 206790671 U | 12/2017 |
| CN | 107708014 A | 2/2018 |
| CN | 107734589 A | 2/2018 |
| CN | 107820155 A | 3/2018 |
| CN | 108271090 A | 7/2018 |
| CN | 109121034 A | 1/2019 |
| EP | 3591997 A1  | 1/2020 |

OTHER PUBLICATIONS

First Office Action from China patent office with English Translation of counterpart Chinese patent Application 201810866720.4, dated Jul. 29, 2019 (12 pages).

Second Office Action from China patent office with English Translation of counterpart Chinese patent Application 201810866720.4, dated Feb. 3, 2020 (11 pages).

Notification to Grant Patent Right for Invention with English Translation of Chinese patent Application 201810866720.4, dated May 8, 2020 (6 pages).

Communication pursuant to Rule 164(1) EPC for EP Application 19843777.4 dated Dec. 17, 2021. (19 pages).

* cited by examiner

METHOD FOR EARBUD SWITCHING, WEARABLE DEVICE, AND STORAGE MEDIUM

CROSS-REFERENCE TO RELATED APPLICATION(S)

The present application is a continuation-application of International (PCT) Patent Application No. PCT/CN2019/098951 filed on Aug. 1, 2019, which claims a foreign priority of Chinese Patent Application No. 201810866720.4, filed on Aug. 1, 2018, the entire contents of all of which are hereby incorporated by reference.

TECHNICAL FIELD

The present disclosure generally relates to terminal devices, and in particular to a method for earbud switching, a wearable device, and a computer-readable non-transitory storage medium.

BACKGROUND

As the popularization and implementation of smart phones, users depend more and more on smart phones. As the development of smart phones, wearable devices such as wireless earphones, smart watches and smart wristbands are also widely used. An example of a wearable device is wireless earphone. A wireless earphone may easily connect to a smart phone and often includes two earbuds, a first earbud and a second earbud.

SUMMARY

In a first aspect, embodiments of the present disclosure provide a method for earbud switching based on volume, applied in a wearable device. The wearable device includes a first earbud and a second earbud, and the method includes: acquiring a first volume of the first earbud and a second volume of the second earbud; calculating a first power consuming speed of the first earbud based on the first volume, calculating a second power consuming speed of the second earbud based on the second volume, and determining an earbud switch strategy between the first earbud and the second earbud based on the first power consuming speed and the second power consuming speed; and transmitting an earbud switch command to an electronic device connected to the wearable device based on the earbud switch strategy, wherein the earbud switch command is configured to instruct the electronic device to switch between the first earbud and the second earbud.

In a second aspect, a wearable device is provided. The wearable device includes a first earbud and a second earbud. Each of the first earbud and the second earbud includes a processing component and a wireless transceiver, the processing component is configured to acquire a first volume of the first earbud and a second volume of the second earbud; calculate a first power consuming speed of the first earbud based on the first volume, calculate a second power consuming speed of the second earbud based on the second volume, and determine an earbud switch strategy between the first earbud and the second earbud according to the first power consuming speed and the second power consuming speed; and control the wireless transceiver to transmit an earbud switch command to an electronic device connected to the wearable device based on the earbud switch strategy, wherein the earbud switch command is configured to indicate the electronic device to switch between the first earbud and the second earbud.

In a third aspect, a computer readable non-transitory storage medium is provided for storing computer programs for electronic data exchange. The computer programs are executed to perform operations of: acquiring a first volume of the first earbud and a second volume of the second earbud; calculating a first power consuming speed of the first earbud based on the first volume, calculating a second power consuming speed of the second earbud based on the second volume, and determining an earbud switch strategy between the first earbud and the second earbud based on the first power consuming speed and the second power consuming speed; and transmitting an earbud switch command to an electronic device connected to the wearable device based on the earbud switch strategy, wherein the earbud switch command is configured to instruct the electronic device to switch between the first earbud and the second earbud.

BRIEF DESCRIPTION OF DRAWINGS

In order to clearly explain the technical solutions in the embodiments of the present disclosure, the drawings used in the description of the embodiments will be briefly described below. Obviously, the drawings in the following description are merely some embodiments of the present disclosure. For those of ordinary skill in the art, other drawings may also be obtained based on these drawings without any creative work.

DETAILED DESCRIPTION

Figure 1:
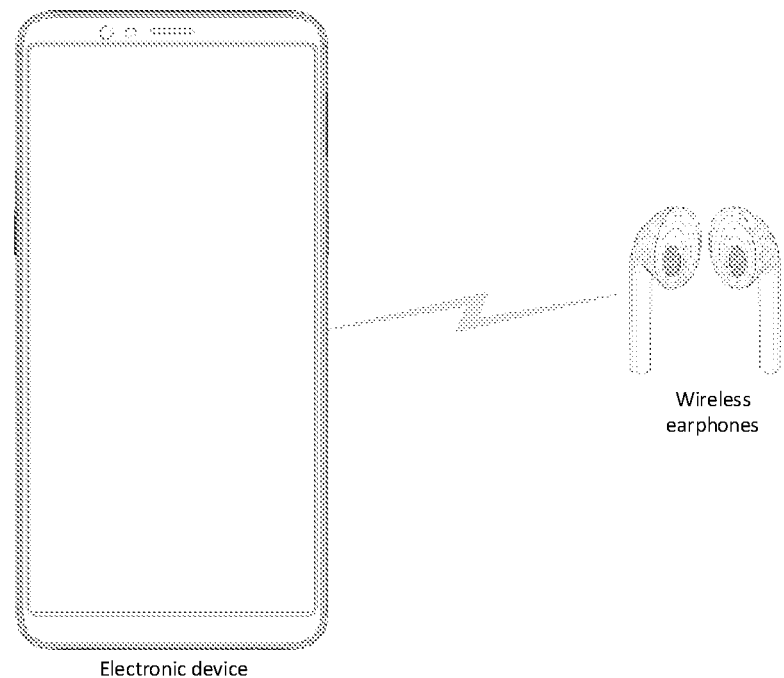
FIG. 1 illustrates a connection structure of a wearable device and a wireless communication device.

The disclosure will now be described in detail with reference to the accompanying drawings and examples. Apparently, the described embodiments are only a part of the embodiments of the present disclosure, not all of the embodiments. All other embodiments obtained by a person of ordinary skill in the art based on the embodiments of the present invention without creative efforts shall fall within the protection scope of the present invention.

The terms "first", "second", and the like used in the specification, the claims, and the accompany drawings of the present disclosure are to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units. Instead, it may optionally include other steps or units that are not listed; alternatively, other steps or units inherent to the process, method, product, or device may also be included.

The term "implementation" referred to herein means that a particular feature, structure, or characteristic described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is explicitly and implicitly understood by those skilled in the art that an implementation described herein may be combined with other implementations.

The wireless communication device provided in embodiments of the present disclosure may include a handheld device, an in-vehicle device, a wearable device, a computing device or other processing device connected to a wireless modem which has wireless communication function. The electronic device may also include different kinds of user equipment (UE), mobile station (MS), terminal device etc. For the sake of simplicity, the above-mentioned devices may all be referred to as wireless communication devices.

A wireless earphone may include a first earbud and a second earbud. Conventionally, the first earbud and the second earbud may not be switched automatically based on volume. Thus, the first and second earbuds may have different power consumption because of the volume, which may reduce user experience.

In a first aspect, embodiments of the present disclosure provide a method for earbud switching based on volume, applied in a wearable device. The wearable device includes a first earbud and a second earbud, and the method includes: acquiring a first volume of the first earbud and a second volume of the second earbud; calculating a first power consuming speed of the first earbud based on the first volume, calculating a second power consuming speed of the second earbud based on the second volume, and determining an earbud switch strategy between the first earbud and the second earbud based on the first power consuming speed and the second power consuming speed; and transmitting an earbud switch command to an electronic device connected to the wearable device based on the earbud switch strategy, wherein the earbud switch command is configured to instruct the electronic device to switch between the first earbud and the second earbud.

In some embodiments, the determining an earbud switch strategy between the first earbud and the second earbud based on the first power consuming speed and the second power consuming speed includes: comparing the first power consuming speed and the second power consuming speed; determining the earbud switch strategy as performing earbud switching in response to the first power consuming speed being greater than the second power consuming speed; or determining the earbud switch strategy as not performing earbud switching in response to the first power consuming speed being less than the second power consuming speed.

In some embodiments, before the determining an earbud switch strategy between the first earbud and the second earbud based on the first power consuming speed and the second power consuming speed, the method further includes: acquiring a first historical volume of the first earbud and a second historical volume of the second earbud; adjusting the first power consuming speed based on the first historical volume; and adjusting the second power consuming speed based on the second historical volume.

In some embodiments, the method further includes: calculating a third power consuming speed of the first earbud based on the third volume, and determining the earbud switch strategy based on a difference value between the third power consuming speed and the second power consuming speed, in response to the first volume changing into a third volume; or calculating a fourth power consuming speed of the second earbud based on the fourth volume, and determining the earbud switch strategy based on a difference value between the first power consuming speed and the fourth power consuming speed, in response to the second volume changing into a fourth volume.

In some embodiments, the first historical volume is an average value of volumes of the first earbud occurring before the first volume; and the second historical volume is an average value of volumes of the second earbud occurring before the second volume.

In some embodiments, the first historical volume is acquired by: acquiring a first application currently run by the electronic device; and acquiring an average value of historical volumes of the first application, wherein the average value of the historical volumes of the first application is taken as the first historical volume.

In some embodiments, the method further includes: periodically detecting a plurality of postures of the wearable device to acquire a plurality of postures; and adjusting a volume of the wearable device based on the plurality of postures.

In some embodiments, the adjusting a volume of the wearable device based on the plurality of postures includes: projecting the plurality of postures into a preset posture coordinate system to acquire a plurality of points, wherein each of the plurality of points corresponds to a posture and a detection time; connecting every two adjacent points of the plurality of points to acquire a first posture curve; calculating an average value K of absolute values of slopes of the every two adjacent ones of the plurality of points of the first posture curve; then deleting the $X^{th}$ point from the first posture curve to acquire a second posture curve in response to an absolute value of a slope $K_{x,x-1}$ of an $X^{th}$ point and an $(X-1)^{th}$ point on the first posture curve being not less than $\alpha*K$; acquiring a largest monotonic interval of the second posture curve and a first time interval corresponding to the largest monotonic interval of the second posture curve; determining that a rotation direction is anticlockwise, and reducing a volume of the wearable device in response to the first time interval being greater than a time threshold and the largest monotonic interval being a monotonically increasing interval; or determining that a rotation direction is clockwise, and increasing a volume of the wearable device in response to the first time interval being greater than the time threshold and the largest monotonic interval being a monotonically decreasing interval. A value of $\alpha$ is not less than 1.

In some embodiments, checking slopes of every two adjacent ones of the plurality of posture points on the second posture curve in order of the detection time to acquire n−1 slopes; finding out a sudden change slope from the n−1 slopes, wherein a polarity of the sudden change slope is opposite to a polarity of a previous slope, and every two adjacent ones of the sudden change slopes constitute a monotonic interval; and determining one of all monotonic intervals of the second posture curve which has most points as the biggest monotonic interval. n is a total amount of the plurality of posture points included in the second posture curve.

In a second aspect, a wearable device is provided. The wearable device includes a first earbud and a second earbud. Each of the first earbud and the second earbud includes a processing component and a wireless transceiver, the processing component is configured to acquire a first volume of the first earbud and a second volume of the second earbud; calculate a first power consuming speed of the first earbud based on the first volume, calculate a second power consuming speed of the second earbud based on the second volume, and determine an earbud switch strategy between the first earbud and the second earbud according to the first power consuming speed and the second power consuming speed; and control the wireless transceiver to transmit an earbud switch command to an electronic device connected to the wearable device based on the earbud switch strategy, wherein the earbud switch command is configured to indicate the electronic device to switch between the first earbud and the second earbud.

In some embodiments, the processing component is specifically configured to: comparing the first power consuming speed and the second power consuming speed; determine the earbud switch strategy as performing earbud switching in response to the first power consuming speed being greater than the second power consuming speed; or determine the earbud switch strategy as not performing earbud switching in response to the first power consuming speed being less than the second power consuming speed.

In some embodiments, the processing component is specifically configured to: acquire a first historical volume of the first earbud and a second historical volume of the second earbud; adjust the first power consuming speed based on the first historical volume; and adjust the second power consuming speed based on the second historical volume.

In some embodiments, the processing component is specifically configured to: calculate a third power consuming speed of the first earbud based on the third volume, and determine the earbud switch strategy based on a difference value between the third power consuming speed and the second power consuming speed, in response to the first volume changing into a third volume; or calculate a fourth power consuming speed of the second earbud based on the fourth volume, and determine the earbud switch strategy based on a difference value between the first power consuming speed and the fourth power consuming speed, in response to the second volume changing into a fourth volume.

In some embodiments, the first historical volume is an average value of volumes of the first earbud occurring before the first volume; and the second historical volume is an average value of volumes of the second earbud occurring before the second volume.

In some embodiments, the processing component is further configured to: acquire a first application currently run by the electronic device; and acquire an average value of a historical volume of the first application, wherein the average value of the historical volume of the first application is taken as the first historical volume.

In some embodiments, the wearable device further includes a gyroscope configured to periodically detect a plurality of postures of the wearable device. The processing component is specifically configured to adjust a volume of the wearable device based on change of the plurality of postures.

In some embodiments, the processing component is further configured to: project the plurality of postures into a preset posture coordinate system to acquire a plurality of points, wherein each of the plurality of points corresponds to a posture and a detection time; connect every two adjacent ones of the plurality of points to acquire a first posture curve; calculate an average value K of absolute values of slopes of the every two adjacent ones of the plurality of points of the first posture curve; deleting the $X^{th}$ point from the first posture curve to acquire a second posture curve in response to an absolute value of a slope $K_{x,x-1}$ of an $X^{th}$ point and an $(X-1)^{th}$ point on the first posture curve being not less than $\alpha * K$; acquire a largest monotonic interval of the second posture curve and a first time interval corresponding to the largest monotonic interval of the second posture curve; determine that a rotation direction is anticlockwise, and reduce a volume of the wearable device in response to the first time interval being greater than a time threshold and the largest monotonic interval being a monotonically increasing interval; or determine that a rotation direction is clockwise, and increase a volume of the wearable device, in response to the first time interval being greater than the time threshold and the largest monotonic interval being a monotonically decreasing interval. A value of $\alpha$ is no less than 1.

In some embodiments, the processing component is further configured to: check slopes of every two adjacent ones of the plurality of posture points on the second posture curve in order of the detection time to acquire n−1 slopes; find out a sudden change slope from the n−1 slopes, wherein a polarity of the sudden change slope is opposite to a polarity of a previous slope, and every two adjacent ones of the sudden change slopes constitute a monotonic interval; and determine one of all monotonic intervals of the second posture curve which has most points as the biggest monotonic interval. n is a total amount of the plurality of posture points included in the second posture curve In a third aspect, a computer readable non-transitory storage medium is provided for storing computer programs for electronic data exchange. The computer programs are executed to perform operations of: acquiring a first volume of the first earbud and a second volume of the second earbud; calculating a first power consuming speed of the first earbud based on the first volume, calculating a second power consuming speed of the second earbud based on the second volume, and determining an earbud switch strategy between the first earbud and the second earbud based on the first power consuming speed and the second power consuming speed; and transmitting an earbud switch command to an electronic device connected to the wearable device based on the earbud switch strategy, wherein the earbud switch command is configured to instruct the electronic device to switch between the first earbud and the second earbud.

In some embodiments, when determining an earbud switch strategy between the first earbud and the second earbud based on the first power consuming speed and the second power consuming speed, the computer programs are further executed to perform operations of: comparing the first power consuming speed and the second power consuming speed; determining the earbud switch strategy as performing earbud switching in response to the first power consuming speed being greater than the second power consuming speed; or determining the earbud switch strategy as not performing earbud switching in response to the first power consuming speed being less than the second power consuming speed.

FIG. 1 illustrates a connection structure of a wireless earphone according to an embodiment of the present disclosure. The connection structure may include an electronic device and a wireless earphone. The wireless earphone may be communicatively connected to the electronic device through a wireless network (e.g., Bluetooth, infrared ray or WIFI). It should be noticed, the wireless earphone may include one or more earbuds, which is not limited herein. In some embodiments, the wireless earphone may send a match request to the electronic device. The electronic device may receive the match request sent by the wearable device. The wearable device may include at least one independent component. In response to the match request, the number of components included in the wearable device may be detected. Information of the wearable device such as power, number of matched devices may be displayed based on the number of components.

Figure 1A:
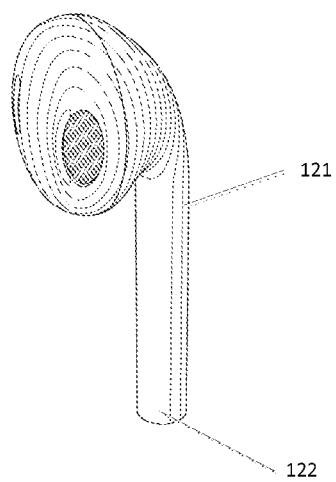
FIG. 1a is a schematic diagram of a wireless earphone according to an embodiment of the present disclosure.

FIG. 1a shows a schematic diagram of a wireless earphone according to an embodiment of the present disclosure. As shown in FIG. 1a, two earbuds may be completely separated. As illustrated, the wireless earphone may include two earbuds. Each earbud may include an earbud housing 121, and a battery arranged outside the earbud housing 121. The earbud may further include a wireless transceiver 122, a processing chip (not shown), and a touch-control panel (not shown). The processing chip may be electrically connected to the touch-control panel and the wireless transceiver. The battery may provide power to all electronic components in the earbud. The electronic components may include, but is not limited to, the wireless transceiver 122, the processing chip, the touch-control panel etc. In detail, the electrical connection may be achieved through a bus. In practical implementations, the electrical connection may be achieved in other manners.

Figure 1B:
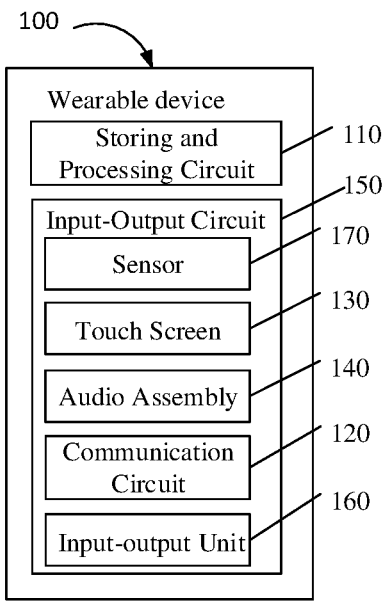
FIG. 1b is a schematic diagram of a wireless earphone according to another embodiment of the present disclosure.

FIG. 1b illustrates a schematic diagram of an electronic device 100 according to an embodiment of the present disclosure. The electronic device 100 includes a storing a processing circuit 110, a communication circuit 120 and an audio assembly 140. The communication circuit 120 and the audio assembly 140 are connected to the storing and processing circuit 110. Certain kinds of electronic devices 100 may further include a display assembly 130 or a touch-control assembly.

The electronic device 100 may include a control circuit. The control circuit may include the storing and processing circuit 110. The storing and processing circuit 110 may be a memory such as hard drive storage, non-volatile storage (e.g., flash memory or other electronic programmable read-only storage for forming a solid-state drive), volatile storage (e.g., static or dynamic random access memory) etc., which is not limited in the present disclosure. The processing circuit in the storing and processing circuit 110 may be utilized control the functioning of the electronic device 100. The processing circuit may be based on one or more micro-processor, micro-controller, digital signal processor, baseband processor, power management unit, audio codec chip, application-specific integrated circuit, display driving integrated circuit etc.

The storing and processing circuit 110 may be configured to run software in the electronic device 100 such as a voice over Internet protocol (VOIP) phone call application, a simultaneous translation function, a media display application, an operation system function etc. The software may be configured to execute some control operations, for example, acquiring an image with a camera, measuring environmental light with an environmental light sensor, measuring proximity with a proximity sensor, information display function based on a LED state indicator, detecting touch events with a touch sensor, operations related to wireless communication function, operations related to collecting and generating audio signal, control operations related to collecting and processing button pressing events, and other functions in the electronic device 100, which is not limited in the present disclosure.

The electronic device may further include an input-output circuit 150. The input-output circuit 150 may be configured to enable the electronic device 100 to achieve data input and output, that is, to allow the electronic device 100 to receive data from external devices and transmit data to external devices. The input-output circuit 150 may further include a sensor 170. The sensor 170 may include an environmental light sensor, a proximity sensor based on light and capacitance, a touch sensor (e.g., touch sensor based on light and/or capacitive touch sensor, wherein the touch sensor may be either a part of a touch-control screen or an independent touch sensor structure), an accelerator sensor or other kind of sensor.

The input-output circuit 150 may further include a touch sensor array. In other words, the display assembly 130 may be a touch-control screen. The touch sensor may be a capacitive touch sensor formed by an array of transparent touch sensor electrodes (e.g., indium tin oxid electrodes), or a touch sensor formed by other touch technology such as acoustic touch, pressure-sensitive touch, resistive touch, optical touch etc., which is not limited in the present disclosure.

The electronic device 100 may further include an audio assembly 140. The audio assembly 140 may be configured to provide an audio input and output function for the electronic device 100. The audio assembly 140 of the electronic device may include a loudspeaker, a microphone, a beeper, a tone generator and other assemblies for generating and detecting sound.

The communication circuit 120 may be configured to provide a capability for the electronic device 100 to communicate with external devices. The communication circuit 120 may include an analog and digital input-output interface circuit and a wireless communication circuit based on radio frequency signal and/or optical signal. The wireless communication circuit of the communication circuit 120 may include radio frequency transceiver circuit, power amplifier circuit, low noise amplifier, switch, filter and antenna. For example, the wireless communication circuit of the communication circuit 120 may include a circuit configured to support near field communication (NFC) by transmitting and receiving near field coupled electromagnetic signals. For example, the communication circuit 120 may include a near field communication antenna and a near field communication transceiver. The communication circuit 120 may further include a cellphone transceiver, a cellphone antenna, a wireless local area network transceiver circuit and a wireless local area network antenna etc.

The electronic device 100 may further include a battery, a power management circuit and other input-output units 160. The input-output units 160 may include a button, a joystick, a click wheel, a scroll wheel, a touch panel, a small-sized keyboard, a keyboard, a camera, a LED or other status indicators.

A user may use the input-output circuit 150 to input commands to control operations of the electronic device 100, and use the output data of the input-output circuit 150 to receive state information from the electronic device 100 and other outputs.

Figure 2:
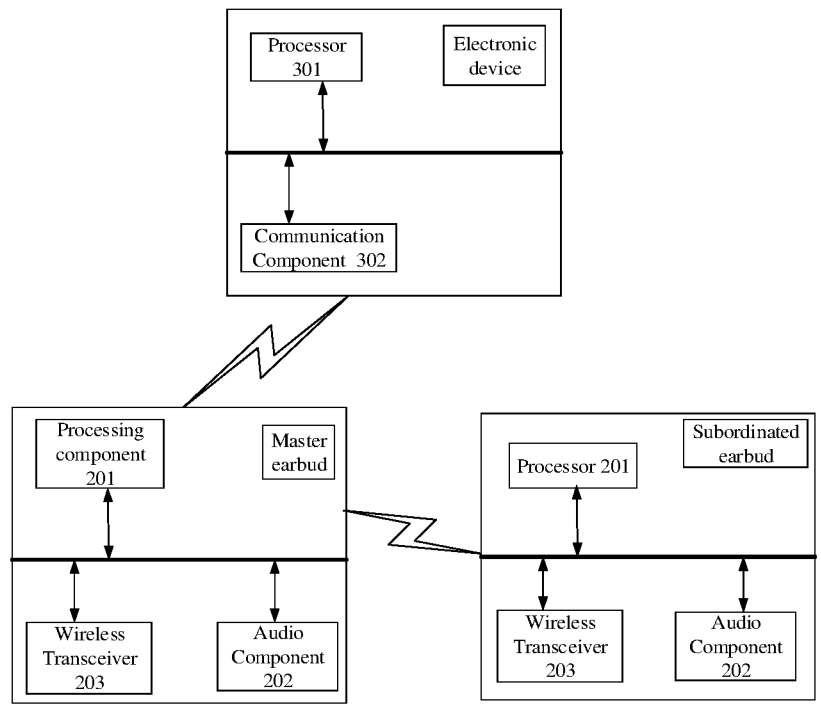
FIG. 2 is a schematic diagram of a wearable device and an electronic device according to an embodiment of the present disclosure.

The present disclosure provides an electronic device which is connected to a wearable device. FIG. 2 is a schematic diagram of an electronic device and a wearable device according to an embodiment of the present disclosure. As shown in FIG. 2, the wearable device includes a first earbud and a second earbud. Each of the first and second earbuds may include a processing component 201, a wireless transceiver 203 and an audio component 202. The processing component 201 may be connected to the audio component 202 and the wireless transceiver 203 respectively. The electronic device shown in FIG. 2 includes a communication component 301 and a processor 302 electrically connected to the communication component 301.

The processing component 201 may be configured to acquire a first volume of the first earbud and a second volume of the second earbud, calculate a first power consuming speed of the first earbud based on the first volume, calculate a second power consuming speed of the second earbud based on the second volume, and determine an earbud switch strategy between the first earbud and the second earbud based on the first power consuming speed and the second power consuming speed.

The first volume may be a volume of the audio component of the first earbud. The audio component may be in different types based on different audio generation methods. For example, the audio component may be a microphone or a loudspeaker if the audio is generated as acoustic waves. Alternatively, the audio component may be a bone conduction sound generator if the audio is generated by bone conduction.

The processing components 201 located in different earbuds may acquire the first volume and the second volume in different ways. In detail, in response to the processing component 201 being located in the first earbud, the processing component 201 may directly read the first volume of the first earbud, control the wireless transceiver to send a volume acquisition request to the second earbud, and receive a volume acquisition response from the second earbud which includes the second volume. In this way, the processing component 201 may acquire the second volume.

In response to the processing component 201 being located in the second earbud, the processing component 201 may acquire the first volume in a similar way to that located in the first earbud, which will not be repeatedly described herein.

The processing component 201 may further be configured to determine whether to control the wireless transceiver 203 to second an earbud switch command to the wearable device based on the earbud switch strategy.

The wireless transceiver may be in various types based on connection manners. For example, the wireless transceiver may be a Bluetooth module, a radio frequency module or a module for other short distance transmission methods. A specific structure of the wireless transceiver is not limited in the present disclosure.

It may be seen, the technical scheme provided in the present disclosure may acquire a first volume of the first earbud and a second volume of the second earbud, calculate the first and second power consuming speeds based on the first and second volumes, and determine an earbud switch strategy according to the first and second power consuming speeds. Thus, the implementation of the present disclosure may achieve switching between the first and second earbuds so as to balance the battery power of the first and second earbuds and extend battery life, which may improve user experience.

In some embodiments, the operation of determining the earbud switch strategy between the first earbud and the second earbud according to the first power consuming speed and the second power consuming speed may include following operations.

The processing component 201 may specifically be configured to compare the first power consuming speed and the second power consuming speed, for example, the processing component 201 may be configured to calculate a difference value between the first power consuming speed and the second power consuming speed. In response to the difference value being positive (i.e. the first power consuming speed being greater than the second power consuming speed), the master-subordination switch strategy is determined as performing master-subordination switching. In response to the difference value being negative (i.e. the first power consuming speed being less than the second power consuming speed), the master-subordination switch strategy may be determined as not performing earbud switching.

In some embodiments, before the operation of determining the earbud switch strategy between the first earbud and the second earbud according to the first power consuming speed and the second power consuming speed, the method may further include following operations.

The processing component 201 may further be configured to acquire a first historical volume of the first earbud and a second historical volume of the second earbud, adjust the first power consuming speed based on the first historical volume, and adjust the second power consuming speed based on the second historical volume.

In some embodiments, the first historical volume is an average value of volumes of the first earbud occurring before the first volume. Practically, the first historical volume may be acquired in other ways. For example, in one embodiment, a first application currently run by the electronic device may be acquired. An average value of a historical volume of the first application may be acquired and taken as the first historical volume. The first historical volume acquired in this method may be more accurate compared to the volume acquired by directly acquiring an average value of volumes of all applications. An individual user may have specific habit in regard to volumes of different applications. Thus, adjusting the power consuming speed based on acquiring the historical volume of the same application may adjust the power consuming speed better.

In some embodiments, the processing component 201 may further be configured to: calculate a third power consuming speed of the first earbud based on the third volume in response to the first volume changing into a third volume; and determine the earbud switch strategy based on a difference value between the third power consuming speed and the second power consuming speed.

In other embodiment, the processing component 201 may further be configured to: calculate a fourth power consuming speed of the second earbud based on the fourth volume in response to the second volume changing into a fourth volume; and determine the earbud switch strategy based on a difference value between the first power consuming speed and the fourth power consuming speed.

In some embodiments, the wearable device may further include a gyroscope configured to periodically detect a plurality of postures of the wearable device.

The processing component may specifically be configured to establish a posture coordinate system. An X axis of the posture coordinate system represents a detection time and a Y axis of the posture coordinate system represents a posture. The processing component may be configured to project postures of the wearable device into the posture coordinate system to acquire a plurality of points, and each of the plurality of points corresponds to a posture and a detection time. Every two adjacent points of the plurality of points may be connected to acquire a first posture curve. An average value K of absolute values of slopes of every two adjacent points of the first posture curve may be calculated. In response to an absolute value of a slope $K_{x,x-1}$ of the $X^{th}$ point and the $(X-1)^{th}$ point on the first posture curve being not less than $\alpha^*K$, the $X^{th}$ point may be deleted from the first posture curve to acquire a second posture curve. The largest monotonic interval of the second posture curve and a first time interval corresponding to the largest monotonic interval of the second posture curve may be acquired. In response to the first time interval being greater than a time threshold, and the largest monotonic interval being a monotonically increasing interval, it may be determined that the rotation direction is anticlockwise, and the volume of the wearable device may be reduced. In response to the first time interval being greater than the time threshold, and the largest monotonic interval being a monotonically decreasing interval, it may be determined that the rotation direction is clockwise, and the volume of the wearable device may be increased. The value of α is not less than 1.

The technical scheme provided in the present embodiment may increase or decrease the volume based on rotation of the wearable device.

Figure 3A:
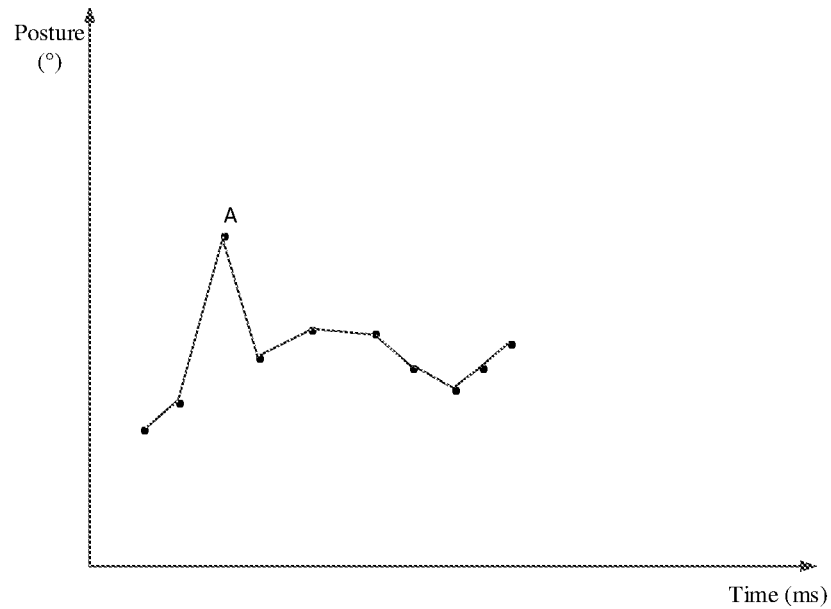
FIG. 3a illustrates a first posture curve according to an embodiment of the present disclosure.

FIG. 3a illustrates a first posture curve according to an embodiment of the present disclosure. As illustrated in FIG. 3a, the slope of the curve has a sudden change at point A. According to experimental studies, the point A may be a falsely detected point because the slope of the curve usually does not have huge change when a user rotates the earbud in a normal situation and the corresponding curve should change smoothly. Thus, points similar to point A should be filtered out. When the falsely detected points are deleted, the second posture curve may be acquired. Therefore, the implementation of the present embodiment may eliminate influence of falsely detected points on determination of rotation direction, which improves the detection accuracy.

Figure 3B:
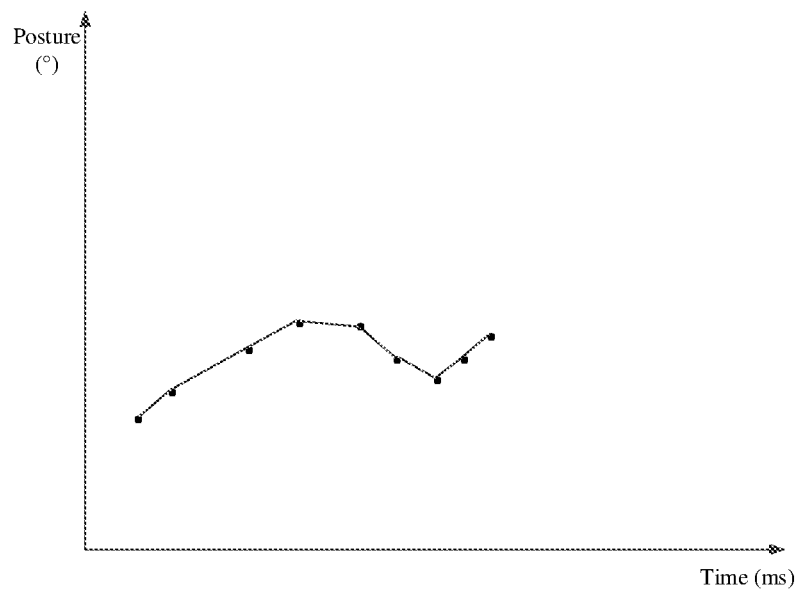
FIG. 3b illustrates a second posture curve according to an embodiment of the present disclosure.

FIG. 3b illustrates a second posture curve according to an embodiment of the present disclosure. As illustrated, the slopes of the second posture curve change very smoothly.

In some embodiments, the processing component may specifically be configured to: check slopes of every two adjacent posture points on the second posture curve in order of the detection time to acquire n−1 slopes, determine sudden change slopes from the n−1 slopes whose polarity is opposite to a polarity of a previous slope (wherein every two adjacent sudden change slopes constitute a monotonic interval), and determine one of all monotonic intervals of the second posture curve which has the most points as the biggest monotonic interval. Here n is a total amount of the posture points included in the second posture curve.

Figure 4:
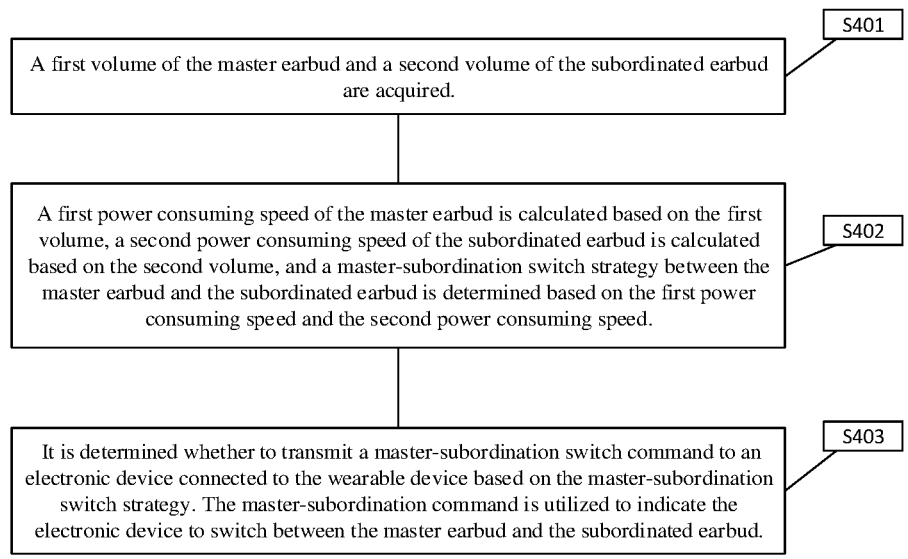
FIG. 4 is a flow chart of a method for earbud switching according to an embodiment of the present disclosure.

FIG. 4 provides a method for earbud switching based on volume which may be executed by a wearable device. The wearable device includes a first earbud and a second earbud. The method may include following operations.

S401: A first volume of the first earbud and a second volume of the second earbud are acquired.

The first volume may be the volume of the audio component of the first earbud. The audio component may be in different types based on different audio generation methods. For example, the audio component may be a microphone or a loudspeaker if the audio is generated as acoustic waves. Alternatively, the audio component may be a bone conduction sound generator if the audio is generated by bone conduction.

S402: A first power consuming speed of the first earbud is calculated based on the first volume, a second power consuming speed of the second earbud is calculated based on the second volume, and an earbud switch strategy between the first earbud and the second earbud is determined based on the first power consuming speed and the second power consuming speed.

S403: It is determined whether to transmit an earbud switch command to an electronic device connected to the wearable device based on the earbud switch strategy. The earbud command is utilized to indicate the electronic device to switch between the first earbud and the second earbud.

The wireless transceiver may be in various types based on connection manners. For example, the wireless transceiver may be a Bluetooth module, a radio frequency module or a module for other short distance transmission methods. A specific structure of the wireless transceiver is not limited in the present disclosure.

It may be seen, the technical scheme provided in the present disclosure may acquire a first volume of the first earbud and a second volume of the second earbud, calculate the first and second power consuming speeds based on the first and second volumes, and determine an earbud switch strategy according to the first and second power consuming speeds. Thus, the implementation of the present disclosure may achieve switching between the first and second earbuds so as to balance the battery power of the first and second earbuds and extend battery life, which may improve user experience.

In some embodiments, the operation of determining the earbud switch strategy between the first earbud and the second earbud based on the first power consuming speed and the second power consuming speed may include: comparing the first power consuming speed and the second power consuming speed (such as calculating a difference value between the first power consuming speed and the second power consuming speed); determining the earbud switch strategy as performing earbud switching in response to the difference value being positive (i.e. in response to the first power consuming speed being greater than the second power consuming speed); or determining the earbud switch strategy as not performing earbud switching in response to the difference value being negative (i.e. in response to the first power consuming speed being less than the second power consuming speed).

In some embodiments, before the operation of determining the earbud switch strategy between the first earbud and the second earbud according to the first power consuming speed and the second power consuming speed, the method may further include: acquiring a first historical volume of the first earbud and a second historical volume of the second earbud; adjusting the first power consuming speed based on the first historical volume; and adjusting the second power consuming speed based on the second historical volume.

In some embodiments, the first historical volume is an average value of volume of the first earbud occurring before the first volume. In practice, the first historical volume may be acquired in other ways. For example, in one embodiment of the present disclosure, a first application currently run by the electronic device may be acquired. An average value of a historical volume of the first application may be acquired and taken as the first historical volume. The first historical volume acquired in this method is more accurate compared to the volume acquired by directly acquiring an average value of volume of all applications. An individual user may have specific habit in regard to volumes of different applications. Thus, adjusting the power consuming speed based on acquiring the historical volume of the same application may adjust the power consuming speed better.

In some embodiments, the method may further include: calculating a third power consuming speed of the first earbud based on the third volume in response to the first volume changing into a third volume; and determining the earbud switch strategy based on a difference value between the third power consuming speed and the second power consuming speed; or calculating a fourth power consuming speed of the second earbud based on the fourth volume in response to the second volume changing into a fourth volume; and determining the earbud switch strategy based on a difference value between the first power consuming speed and the fourth power consuming speed.

In some embodiments, the wearable device may further include a gyroscope configured to periodically detect multiple postures of the wearable device to acquire multiple postures. The method may further include: establishing a posture coordinate system whose X axis represents a detection time and Y axis represents a posture; projecting the plurality of postures into the posture coordinate system to acquire a plurality of points each of which corresponds to a posture and a detection time; connecting every two adjacent ones of the plurality of points to acquire a first posture curve; calculating an average value K of absolute values of slopes of the every two adjacent ones of the plurality of points of the first posture curve; deleting the $X^{th}$ point from the first posture curve to acquire a second posture curve in response to an absolute value of a slope $K_{x,x-1}$ of an $X^{th}$ point and an $(X-1)^{th}$ point on the first posture curve being not less than $\alpha*K$; acquiring a largest monotonic interval of the second posture curve and a first time interval corresponding to the largest monotonic interval of the second posture curve; determining that a rotation direction is anticlockwise in response to the first time interval being greater than a time threshold and the largest monotonic interval being a monotonically increasing interval, and reducing a volume of the wearable device; or determining that a rotation direction is clockwise in response to the first time interval being greater than the time threshold and the largest monotonic interval being a monotonically decreasing interval, and increasing a volume of the wearable device. The value of $\alpha$ is not less than 1.

The technical scheme provided in the present embodiment may increase or decrease the volume based on rotation of the wearable device.

Figure 5:
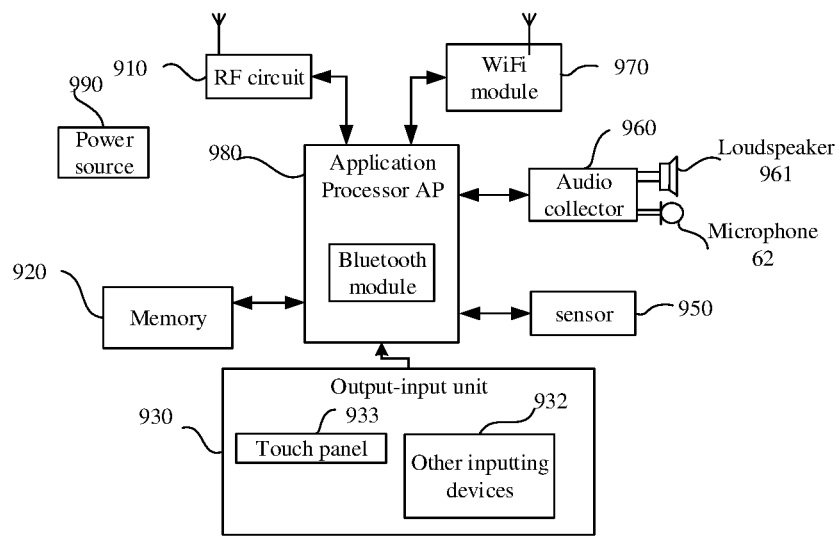
FIG. 5 is a schematic diagram of a cellphone according to an embodiment of the present disclosure.

FIG. 5 illustrates a block diagram of parts of a wearable device connected to a mobile terminal according to an embodiment of the present disclosure. As illustrated in FIG. 5, the wearable device includes a radio frequency circuit 910, a memory 920, an input unit 930, a sensor 950, an audio collector 960, a wireless fidelity (WIFI) module 970, an application processor 980, a power source 990 etc. Those of ordinary skills in the art should understand, the components and connection of the wearable device as illustrated in FIG. 5 are not limitation of the wearable device. In practice, the wearable device may include components more or less than those illustrated, some of the components may be combined or arranged in a different way. For example, the radio frequency circuit 910 may be connected to one or more antenna.

The components of the wearable device will be explained below in further detail with reference to FIG. 5.

The input unit 930 may be configured to receive an input digit or character information to generate signal inputs related to user setting and functional control of a mobile phone. In detail, the input unit 930 may include a touch-control screen 933 and another input device 932. The input device 932 may include, but is not limited to, one or more of a physical button, a functional button (e.g., volume control button, switch button etc.), a trackball, a joystick and so on.

The radio frequency circuit 910 is configured to wirelessly connect to the electronic device.

The application processor 980 is configured to: acquire a first volume of the first earbud and a second volume of the second earbud, calculate a first power consuming speed of the first earbud based on the first volume, calculate a second power consuming speed of the second earbud based on the second volume, and determine an earbud switch strategy between the first earbud and the second earbud based on the first power consuming speed and the second power consuming speed.

The application processor 980 is further configured to control the radio frequency circuit 910 to transmit an earbud command to an electronic device connected to the wearable device based on the earbud switch strategy. The earbud switch command may be configured to indicate the electronic device to switch between the first earbud and the second earbud.

In some embodiments, the application processor 980 is further configured to compare the first power consuming speed and the second power consuming speed, such as, to calculate a difference value between the first power consuming speed and the second power consuming speed. In response to the difference value being positive (i.e. the first power consuming speed being greater than the second power consuming speed), the earbud switch strategy is determined as performing earbud switching. In response to the difference value being negative (i.e. the first power consuming speed being less than the second power consuming speed), the earbud switch strategy is determined as not performing earbud switching.

In some embodiments, the application processor 980 is further configured to acquire a first historical volume of the first earbud and a second historical volume of the second earbud, adjust the first power consuming speed based on the first historical volume, and adjust the second power consuming speed based on the second historical volume.

In some embodiments, the application processor AP989 is specifically configured to: calculate a third power consuming speed of the first earbud based on the third volume in response to the first volume changing into a third volume, and determine the earbud switch strategy based on a difference value between the third power consuming speed and the second power consuming speed.

In other embodiment, the processing component 201 is further configured to: calculate a fourth power consuming speed of the second earbud based on the fourth volume in response to the second volume changing into a fourth volume, and determine the earbud switch strategy based on a difference value between the first power consuming speed and the fourth power consuming speed.

The application processor 980 is a control center of the wearable device, and may be connected to different parts of the entire wearable device through various interfaces and circuits. The application processor 980 may execute various functions and process data of the wearable device by executing software program and/or module stored in the memory 920 and by using data stored in the memory 920, so as to monitor the entire wearable device. In some embodiments, the application processor 980 may include one or more processing units. In some embodiments, the application processor 980 may integrate an application processor and a modem processor. The application processor may mainly process the operation system, user interface and application program, and the modem processor may mainly process wireless communication. It should be understood, in other embodiments, the modem processor may not be integrated in the application processor 980.

The memory 920 may include a high-speed random access memory, a non-volatile memory (e.g., at least one flash memory) or other volatile solid state memory.

The radio frequency circuit 910 may be utilized to receive and transmit information. The radio frequency circuit 910 may include, but is not limited to, antenna, at least one amplifier, transceiver, coupler, low noise amplifier, diplexer and so on. The radio frequency circuit 910 may communicate with other devices and networks through wireless communication. The wireless communication may adopt any communication standard or protocol including, but not limited to, Bluetooth, WIFI, Global System for Mobile Communications, General Packet Radio Service, Code Division Multiple Access, Bandwidth Code Division Multiple Access, Long-term Evolution, New Radio and so on.

The wearable device may further include at least one type of sensor 950 such as ultrasonic sensor, posture sensor, optical sensor, movement senor and so on. Specifically, the optical sensor may include an environmental light sensor and a proximity sensor. The environmental light sensor may detect the intensity of light. The movement sensor may detect whether the wearable device is plugged in ears, based on which brightness of the touch-control screen may be adjusted. The proximity sensor may be utilized to turn off the touch-control screen and/or backlight when detecting the wearable device is moved close to ears. As one kind of movement sensors, the accelerometer may detect accelerometers of the wearable device in each direction (usually three axe), and detect the value and direction of gravity, which may be utilized in application needing to identify the posture of the wearable device such as switching between landscape and portrait, some video games, magnetometer attitude calibration, and in vibration detection related function such as pedometer and tap detection. For the sake of simplicity, the optional gyroscope, barometer, hygrometer, thermometer, infrared sensor of the wearable device will not be explained herein.

The audio collector 960, the loudspeaker 961 and the microphone 962 may provide the audio interface between a user and the wearable device. The audio collector 960 may convert the received audio data into electrical signals and transmit the data to the loudspeaker 961 where the electrical signals are converted into sound signal and displayed. The microphone 962 may convert collected sound signals into electrical signals, which are received and converted into audio data by the audio collector 960. The audio data is then processed by the application processor 980 and transmitted to, for example, a cellphone through the radio frequency circuit 910. Alternatively, the audio data may be stored in the memory 920 and wait for further operation.

WIFI belongs to short distance wireless transmission technology. The wearable device may help the user receive and transmit data through the WIFI module 970 which provides wireless Internet access to the user. It should be understood, although the WIFI module 970 is illustrated in FIG. 5, it is not a fundamental component of the wearable device and may be omitted without changing the scope of the present disclosure.

The wearable device may include a Bluetooth module for realizing connection to an electronic device. The Bluetooth module may be disposed separately. In other embodiments, the Bluetooth module may be integrated in the application processor.

The wearable device may further include a power source 990 (e.g., battery) configured to provide energy to the components. In some embodiments, the power source may be logically connected to the application processor 980 through the power management system so that the power source 990 may achieve different functions such as charging, discharging and power consumption management through the power management system.

Although not illustrated, the wearable device may further include a camera, a fill light device, a light sensor etc., which will not be explained in detail herein.

According to the present disclosure, after acquiring the signal sent by the user, the collector may control the wireless transceiver to send the earbud switch command when determining the signal is related to switching between the first and second earbuds. Thus, the interconnection between the first and second earbuds may be achieved. The user may switch between the first and second earbuds based on his/her own wish, which may improve user experience.

Embodiments of the present disclosure further provide a non-volatile computer readable storage medium configured to store computer programs for electronic data exchange. The computer programs, when executed, performs parts or all of the method for earbud switching based on volume described in any foregoing embodiment on a computer.

Embodiments of the present disclosure further provide a program product including a non-volatile computer readable storage medium for storing computer programs. The computer programs, when executed, performs parts or all of the method for earbud switching based on volume described in any foregoing embodiment on a computer.

Different embodiments of the present disclosure described above each have their own focus. Related description may be found in other embodiments if a part is not explained in detailed in one embodiment.

It is understood that the disclosed system, device, and method in the embodiments of the present disclosure may be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments.

Moreover, each of the functional units in each of the embodiments may be integrated in one processing unit, physically independent, or integrated in one processing unit with two or more than two units.

The above describes the embodiments of the present application. It should be noted that for those of ordinary skill in the art, without departing from the principle of the embodiments of the present application, various improvements and modifications can be made. These improvements and modifications are also included in the scope of protection of this application.

What is claimed is:

1. A method for earbud switching based on volume, applied in a wearable device, wherein the wearable device comprises a first earbud and a second earbud, the method comprising:
  acquiring a first volume of the first earbud and a second volume of the second earbud;
  calculating a first power consuming speed of the first earbud based on the first volume, calculating a second power consuming speed of the second earbud based on the second volume, and determining an earbud switch strategy between the first earbud and the second earbud based on the first power consuming speed and the second power consuming speed; and transmitting an earbud switch command to an electronic device connected to the wearable device based on the earbud switch strategy, wherein the earbud switch command is configured to instruct the electronic device to switch between the first earbud and the second earbud.

2. The method of claim 1, wherein the determining an earbud switch strategy between the first earbud and the second earbud based on the first power consuming speed and the second power consuming speed comprises:

comparing the first power consuming speed and the second power consuming speed;

determining the earbud switch strategy as performing earbud switching in response to the first power consuming speed being greater than the second power consuming speed; or determining the earbud switch strategy as not performing earbud switching in response to the first power consuming speed being less than the second power consuming speed.

3. The method of claim 1, before the determining an earbud switch strategy between the first earbud and the second earbud based on the first power consuming speed and the second power consuming speed, further comprising:

acquiring a first historical volume of the first earbud and a second historical volume of the second earbud;

adjusting the first power consuming speed based on the first historical volume; and adjusting the second power consuming speed based on the second historical volume.

4. The method of claim 1, further comprising:

calculating a third power consuming speed of the first earbud based on a third volume, and determining the earbud switch strategy based on a difference value between the third power consuming speed and the second power consuming speed, in response to the first volume changing into the third volume; or calculating a fourth power consuming speed of the second earbud based on a fourth volume, and determining the earbud switch strategy based on a difference value between the first power consuming speed and the fourth power consuming speed, in response to the second volume changing into the fourth volume.

5. The method of claim 3, wherein the first historical volume is an average value of volumes of the first earbud occurring before the first volume; and the second historical volume is an average value of volumes of the second earbud occurring before the second volume.

6. The method of claim 5, wherein the first historical volume is acquired by:

acquiring a first application currently run by the electronic device; and acquiring an average value of historical volumes of the first application, wherein the average value of the historical volumes of the first application is taken as the first historical volume.

7. The method of claim 1, further comprising:
periodically detecting a plurality of postures of the wearable device to acquire a plurality of postures; and adjusting a volume of the wearable device based on the plurality of postures.

8. The method of claim 7, wherein the adjusting a volume of the wearable device based on the plurality of postures comprises:

projecting the plurality of postures into a preset posture coordinate system to acquire a plurality of points, wherein each of the plurality of points corresponds to a posture and a detection time;

connecting every two adjacent points of the plurality of points to acquire a first posture curve;

calculating an average value K of absolute values of slopes of the every two adjacent points of the plurality of points of the first posture curve;

then deleting an $X^{th}$ point from the first posture curve to acquire a second posture curve in response to an absolute value of a slope $K_{x,x-1}$ of the $X^{th}$ point and an $(X-1)^{th}$ point on the first posture curve being not less than $\alpha*K$, acquiring a largest monotonic interval of the second posture curve and a first time interval corresponding to the largest monotonic interval of the second posture curve;

determining that a rotation direction is anticlockwise, and reducing a volume of the wearable device in response to the first time interval being greater than a time threshold and the largest monotonic interval being a monotonically increasing interval; or determining that a rotation direction is clockwise, and increasing a volume of the wearable device in response to the first time interval being greater than the time threshold and the largest monotonic interval being a monotonically decreasing interval;

wherein a value of $\alpha$ is not less than 1.

9. The method of claim 8, further comprising:

checking slopes of every two adjacent ones of the plurality of posture points on the second posture curve in order of the detection time to acquire n−1 slopes;

finding out a sudden change slope from the n−1 slopes, wherein a polarity of the sudden change slope is opposite to a polarity of a previous slope, and every two adjacent ones of the sudden change slopes constitute a monotonic interval; and determining one of all monotonic intervals of the second posture curve which has most points as the biggest monotonic interval;

wherein n is a total amount of the plurality of posture points included in the second posture curve.

10. A wearable device, comprising a first earbud and a second earbud, wherein each of the first earbud and the second earbud comprises a processing component and a wireless transceiver, the processing component is configured to:

acquire a first volume of the first earbud and a second volume of the second earbud;

calculate a first power consuming speed of the first earbud based on the first volume, calculate a second power consuming speed of the second earbud based on the second volume, and determine an earbud switch strategy between the first earbud and the second earbud according to the first power consuming speed and the second power consuming speed; and control the wireless transceiver to transmit an earbud switch command to an electronic device connected to the wearable device based on the earbud switch strategy, wherein the earbud switch command is configured to indicate the electronic device to switch between the first earbud and the second earbud.

11. The wearable device of claim 10, the processing component is specifically configured to:
   comparing the first power consuming speed and the second power consuming speed;
   determine the earbud switch strategy as performing earbud switching in response to the first power consuming speed being greater than the second power consuming speed; or
   determine the earbud switch strategy as not performing earbud switching in response to the first power consuming speed being less than the second power consuming speed.

12. The wearable device of claim 10, wherein the processing component is specifically configured to:
   acquire a first historical volume of the first earbud and a second historical volume of the second earbud;
   adjust the first power consuming speed based on the first historical volume; and
   adjust the second power consuming speed based on the second historical volume.

13. The wearable device of claim 12, wherein the processing component is specifically configured to:
   calculate a third power consuming speed of the first earbud based on a third volume, and determine the earbud switch strategy based on a difference value between the third power consuming speed and the second power consuming speed, in response to the first volume changing into the third volume; or
   calculate a fourth power consuming speed of the second earbud based on a fourth volume, and determine the earbud switch strategy based on a difference value between the first power consuming speed and the fourth power consuming speed, in response to the second volume changing into the fourth volume.

14. The wearable device of claim 13, wherein
   the first historical volume is an average value of volumes of the first earbud occurring before the first volume; and
   the second historical volume is an average value of volumes of the second earbud occurring before the second volume.

15. The wearable device of claim 14, wherein the processing component is further configured to:
   acquire a first application currently run by the electronic device; and
   acquire an average value of a historical volume of the first application, wherein the average value of the historical volume of the first application is taken as the first historical volume.

16. The wearable device of claim 10, further comprising a gyroscope configured to periodically detect a plurality of postures of the wearable device;
   wherein the processing component is specifically configured to adjust a volume of the wearable device based on change of the plurality of postures.

17. The wearable device of claim 16, wherein the processing component is further configured to:
   project the plurality of postures into a preset posture coordinate system to acquire a plurality of points, wherein each of the plurality of points corresponds to a posture and a detection time;
   connect every two adjacent ones of the plurality of points to acquire a first posture curve;
   calculate an average value K of absolute values of slopes of the every two adjacent points of the plurality of points of the first posture curve;
   deleting a $X^{th}$ point from the first posture curve to acquire a second posture curve in response to an absolute value of a slope $K_{x,x-1}$ of the $X^{th}$ point and an $(X-1)^{th}$ point on the first posture curve being not less than $\alpha*K$;
   acquire a largest monotonic interval of the second posture curve and a first time interval corresponding to the largest monotonic interval of the second posture curve;
   determine that a rotation direction is anticlockwise, and reduce a volume of the wearable device in response to the first time interval being greater than a time threshold and the largest monotonic interval being a monotonically increasing interval; or
   determine that a rotation direction is clockwise, and increase a volume of the wearable device, in response to the first time interval being greater than the time threshold and the largest monotonic interval being a monotonically decreasing interval;
   wherein a value of $\alpha$ is no less than 1.

18. The wearable device of claim 17, wherein the processing component is further configured to:
   check slopes of every two adjacent ones of the plurality of posture points on the second posture curve in order of the detection time to acquire n−1 slopes;
   find out a sudden change slope from the n−1 slopes, wherein a polarity of the sudden change slope is opposite to a polarity of a previous slope, and every two adjacent ones of the sudden change slopes constitute a monotonic interval; and
   determine one of all monotonic intervals of the second posture curve which has most points as the biggest monotonic interval;
   wherein n is a total amount of the plurality of posture points included in the second posture curve.

19. A computer readable non-transitory storage medium configured to store computer programs for electronic data exchange, wherein the computer programs are executed to perform operations of:
   acquiring a first volume of a first earbud and a second volume of a second earbud;
   calculating a first power consuming speed of the first earbud based on the first volume, calculating a second power consuming speed of the second earbud based on the second volume, and determining an earbud switch strategy between the first earbud and the second earbud based on the first power consuming speed and the second power consuming speed; and
   transmitting an earbud switch command to an electronic device connected to a wearable device based on the earbud switch strategy, wherein the earbud switch command is configured to instruct the electronic device to switch between the first earbud and the second earbud.

20. The computer readable non-transitory storage medium according to claim 19, wherein when determining an earbud switch strategy between the first earbud and the second earbud based on the first power consuming speed and the second power consuming speed, the computer programs are further executed to perform operations of:
   comparing the first power consuming speed and the second power consuming speed;
   determining the earbud switch strategy as performing earbud switching in response to the first power consuming speed being greater than the second power consuming speed; or determining the earbud switch strategy as not performing earbud switching in response to the first power consuming speed being less than the second power consuming speed.

\* \* \* \* \*